(12) United States Patent
Funk (10) Patent No.: US 7,986,809 B1
(45) Date of Patent: Jul. 26, 2011

(54) EQUATION OF LINKED MULTIPLE SOURCE MEASUREMENTS TO A UNIQUELY IDENTIFIED OBJECT

(75) Inventor: Clarence John Funk, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 592 days.

(21) Appl. No.: 12/194,424

(22) Filed: Aug. 19, 2008

(51) Int. Cl.
*G06K 9/00* (2006.01)

(52) U.S. Cl. .......... 382/103; 348/169; 342/29; 342/41; 342/90

(58) Field of Classification Search .......... 382/103; 348/169; 342/1, 29, 41, 90
See application file for complete search history.

(56) References Cited

U.S. PATENT DOCUMENTS

| | | | |
|---|---|---|---|
| 5,969,665 A * | 10/1999 | Yufa | 342/41 |
| RE39,053 E * | 4/2006 | Rees | 342/29 |
| 7,099,755 B2 * | 8/2006 | Mueller et al. | 701/21 |
| 7,692,573 B1 * | 4/2010 | Funk | 342/90 |
| 7,817,079 B1 * | 10/2010 | Funk | 342/41 |
| 2003/0112171 A1 * | 6/2003 | Michaelson et al. | 342/41 |

* cited by examiner

*Primary Examiner* — Tom Y Lu
(74) *Attorney, Agent, or Firm* — Kyle Eppele; J. Eric Anderson (57) ABSTRACT

Methods and systems are disclosed to associate input data with status, location, and technical attributes to arrive at a uniquely identified candidate object by obtaining a set of initial candidate objects based on input data being compared to known technical attributes of uniquely identified objects, obtaining best-known object location and status history for each initial candidate object using previously known location and status information of each initial candidate object, assigning a statistical weight to each initial candidate object based on its maximum calculated speed and speed capabilities of each initial candidate object, generating an association probability of each of the initial candidate objects to the input data to arrive at a set of final candidate objects, and re-evaluating any of the above with data considered to be current that was not used, wherein the set of final candidate objects are uniquely identified candidate objects arrived at with current data.

19 Claims, 3 Drawing Sheets

EQUATION OF LINKED MULTIPLE SOURCE MEASUREMENTS TO A UNIQUELY IDENTIFIED OBJECT

FEDERALLY SPONSORED RESEARCH AND DEVELOPMENT

This invention (Navy Case No. 97,579) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice 619-553-2778; email T2@spawar.navy.mil.

CROSS REFERENCE TO RELATED APPLICATIONS

This application is related to U.S. patent application Ser. No. 12/165,779, filed Jul. 1, 2008, (Navy Case 97,580) titled "SYSTEM AND METHOD FOR TARGET IDENTIFICATION USING PROBABILISTIC ASSOCIATION OF SENSOR INPUT TO KNOWN TARGETS," by the present inventor Clarence J. Funk, the contents of which are incorporated by reference in its entirety herein, hereafter referred to as the Association of Sensor Input Application.

BACKGROUND OF THE INVENTION

1. Field

This disclosure relates to object or object identification. More particularly, this disclosure relates to deterministically updating and linking multiple source data to a uniquely identified object or object.

2. Background

Object or object identification and tracking is a field of great interest in commercial and military circles. However, the accuracy and consolidation of information from multiple sources to uniquely identify an object is typically a fragmented process, often having a poor track record. Therefore, there has been a long-standing need to address these and other deficiencies in the art.

DETAILED DESCRIPTION OF THE EMBODIMENTS

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details.

It is understood in the context of this disclosure that the term "object" may refer to an object, a ship, a vehicle, a terrestrial or non-terrestrial object, tracked object, etc. Accordingly, any of the above terms may be used interchangeably, depending on the mode of application.

From first principles, the generation of comprehensive intelligence on objects of interest requires the unique identification of these objects. Any systematic object identification method that will provide an identification label for an object from the time the object is conceived and planned to the time the object is destroyed or completely disassembled in a salvage operation will provide the object identification information that is consistent with the spirit and scope of this disclosure.

The systems and methods detailed in this disclosure provide efficient means to update or equate deterministically linked multiple source sensor measurements/data to uniquely identified objects. "Equation" is the creation of a deterministic linkage between the measurements/sensor data and the uniquely identified objects. The equation of sensor data is necessary to the development of comprehensive intelligence about the uniquely identified object and permits the creation and maintenance of a comprehensive object location and status history database for each object of interest.

Equation of sensor measurement also permits the creation of a time-dependent object technical characteristics database that provides detailed information on the technical behavior of the various subsystems associated with each uniquely identified object. The technical characteristics of the specific propulsion systems, communication systems, radar systems, weapon systems, and sonar systems, for example, used by each uniquely defined object can be included in the object technical characteristics database. The object technical characteristics database information is time dependent since the technical characteristics of the specific subsystems change in time as the object is repaired and upgraded with new technical equipment.

The framework supporting the implementation of the equation of linked multiple source sensor measurements to a uniquely identified object is described in detail in the Association of Sensor Input Application. The Association of Sensor Input Application discloses systems and methods for the association of multiple source sensor data with candidate objects and the determination of the probability that a sensor measurement can be associated with uniquely identified candidate objects. Beginning from initial candidate objects selection, they are processed or selected on a basis that the parametric characteristics provided by the sensor data is consistent with technical characteristics of the subsystems found on the candidate objects. The candidate selection process then determines the speeds at which the candidate objects must travel over obstacle avoidance paths in order to be associated with the sensor data and calculates a set of probabilities that the candidate objects can be associated with the sensor data.

However, as described in this present disclosure, it should be understood that as time evolves new sensors' measurements or data may be generated and therefore should be deterministically linked to the initial sensor data by various correlation, tracking, and multiple source data fusion algorithms. As new sensor data is linked to the initial sensor data, the geographical and parametric characteristics of the linked set of sensor data can change. In addition the comprehensive object status and geolocation histories of the candidate objects can change.

In various embodiments of this disclosure, the candidate selection algorithm is used to "reprocess" the updated information and a new set of association probabilities is calculated for the candidate objects. When this process converges to the point that only a final candidate object remains, the sensor data can be "equated" to the final candidate object. Accordingly, the exemplary methods and systems for final candidate selection disclosed in the Association of Sensor Input Application can be modified to reflect the arrival and usage of new or updated information, as further described below.

Figure 1:
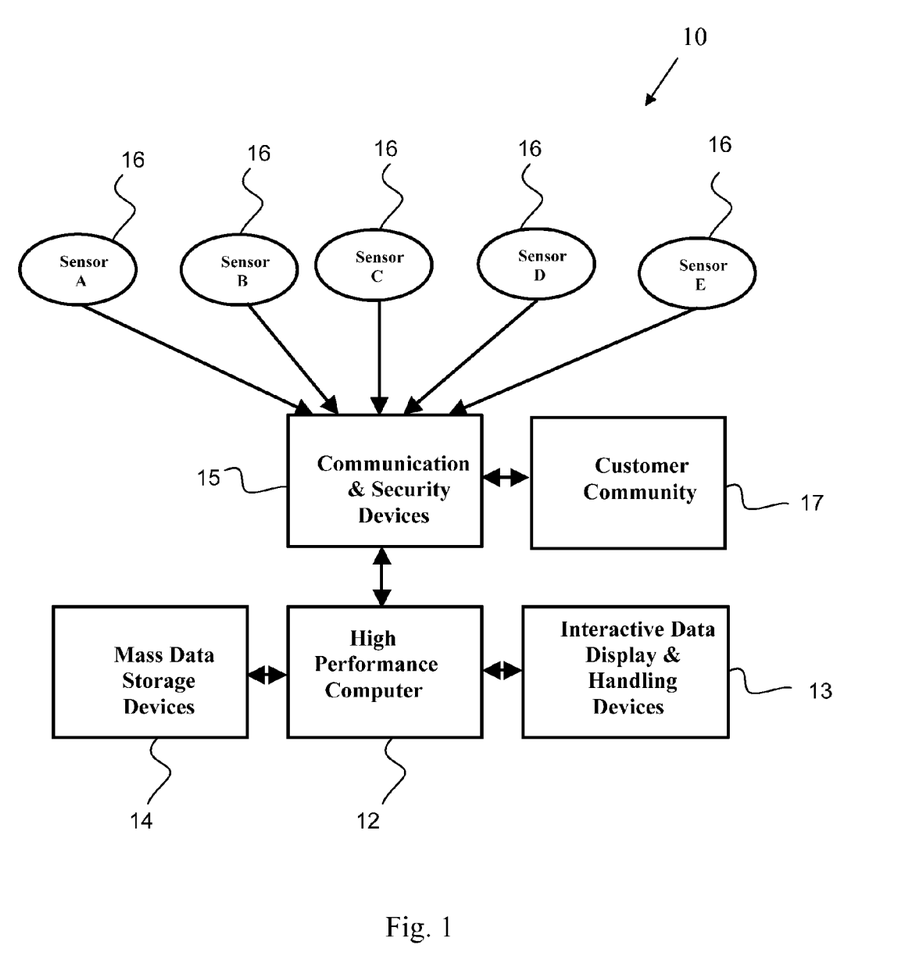
FIG. 1 is a block diagram illustrating various hardware components for implementing an exemplary embodiment of this disclosure.

FIG. 1 contains an illustration of a system 10 suitable for implementation of an exemplary embodiment of the methods and systems disclosed herein. The system 10 contains a high performance computer 12, interactive data display and handling devices 13, mass data storage devices 14, communication and security devices 15, and sensor systems 16 that generate digital measurements on objects of interest (not shown). Additionally, the customer community 17 information can be coupled to the communication and security devices 15, or may be housed in another computer system, or may be part of a database, or even actually human input, such as an analyst. The high performance computer 12 runs an exemplary process for equating a set of deterministically linked sensor measurements to a uniquely identified object, as will be further described below. In one of many possible operational scenarios, object information from the sensors 16 is forwarded to the communication and security devices 15, which forward the information via typically secure channels to the high performance computer 12. Customer community 17 may also provide human intelligence (HUMINT) information to the communication and security devices 15. The information may be stored on the mass data storage devices 14 or other information stored on the mass data storage devices 14 may be used by the high performance computer 12. The interactive data display & handling devices operate to interface the "processed" information from the high performance computer 12 to personnel.

It should be appreciated that in some aspects, the hardware components shown in FIG. 1 are not intended to be an exhaustive list of components, as some components may be incorporated into a single component or multiple components, according to design preference. Accordingly, the list of hardware components provided in FIG. 1 is intended to illustrate only one of several possible hardware components currently available, whereas advances in technology or design constraints/goals will introduce or remove various components to facilitate the design objectives described herein.

Figure 2:
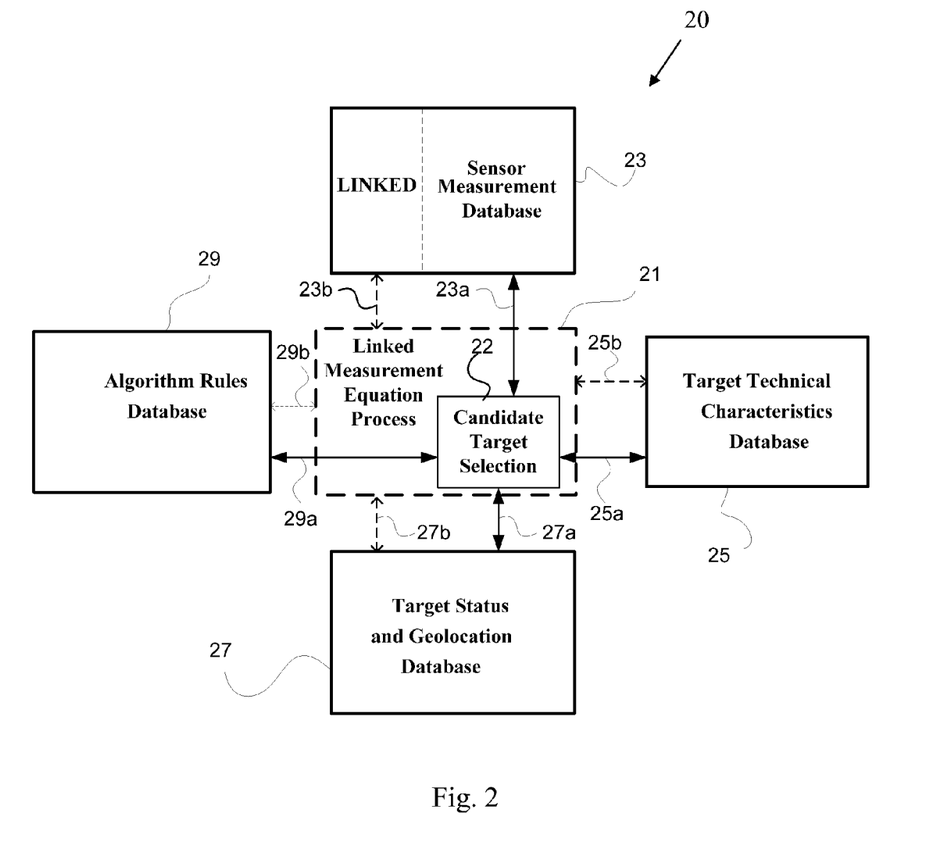
FIG. 2 is a block diagram illustrating various sub-processes for implementing an exemplary embodiment of this disclosure.

FIG. 2 is a block diagram 20 illustrating an exemplary Linked measurement equation process 21 and supporting subprocesses to determine the unique candidate object to which the linked sensor measurements can be equated. These four subprocesses, supported, preferably but not necessarily, by databases, are the Linked sensor measurement database 23; the Object technical characteristics database 25; the Object status and geolocation database 27; and the Algorithm rules database 29. These subprocesses may be driven by a computer or processing engine.

As shown in FIG. 2, each of these subprocesses 23, 25, 27 and 29 communicate information via links 23a, 25a, 27a, and 29a, respectively, to the Candidate object selection module 22, which operates within the framework of the Linked measurement equation process 21. The Candidate object selection module 22 may be of the form described in the Association of Sensor Input Application, or of an alternate form according to design preference. The Candidate object selection module 22 can operate as a means for obtaining a set of initial candidate objects based on input data being compared to known attributes of uniquely identified objects.

The Object status and geolocation database 27 can operate as a means for obtaining best known object location and status history for each initial candidate object using previously known location and status information of each initial candidate object. The Algorithm rules database 29 may operate as a means for assigning a statistical weight to each initial candidate object based on its maximum calculated speed and speed capabilities of each initial candidate object, and as a means for generating an association probability of each of the initial candidate objects to the input data to arrive at a set of final candidate objects.

The Linked measurement equation process 21 directly or indirectly modifies processes controlled by the Candidate object selection module 22 to account for "new" or updated information or data arriving from the Linked sensor measurement database 23, as illustrated, for example, via communication line 23b. Of course, it should be understood that communication lines 23b and 23a may be in the same communication channel, whereas only one communication line may be used to transfer information between the Linked sensor measurement database 23 to the Linked measurement equation process 21. Similarly, based on any "new" information arriving via channel 25b from the Object technical characteristics database 25, the Linked measurement equation process 21 may modify the Candidate object selection module 22's operation Also, based on any "new" information arriving via channel 27b from the Object status and geolocation database 27, the Linked measurement equation process 21 may modify the Candidate object selection module 22's operation. Additionally, on any "new" information arriving via channel 29b from the Algorithm rules database 29, the Linked measurement equation process 21 may modify the Candidate object selection module 22's operation. Therefore, the Linked measurement equation process 21 may operate as a means for re-evaluating any of the above processes/modules with data considered to be current that was not used, wherein the set of final candidate objects are understood as uniquely identified candidate objects arrived at with current data. As alluded earlier, each of the "updated" information channels 25b, 27b, and 29b may be, in some embodiments, coincident with the original information channels, 25a, 27a, and 29a, respectively It should be appreciated that in various exemplary embodiments, it may be desirable to only implement updates from the Linked sensor measurement database 23, rather than from each of the other subprocesses 25, 27, and 29 and, therefore, update channels 25b, 27b, and 29b may not be realized, depending on the mode of application.

The implementation of the various exemplary embodiments for the Linked measurement equation process 21 described herein, is similar in many aspects to those of the Association of Sensor Input Application with the exception of some of the following differences:

1. Linked sensor measurements that are produced by multiple source sensor measurement correlation, tracking, and fusion processes provide the input data for the object equation process.

2. The unique object equation process finds one and only one uniquely identified candidate object to associate with the linked sensor measurements (these linked sensor measurements may be newly arrived or updated information from the Linked sensor measurement database 23).

3. The identification label can be stored as an "indexed" data field in linked sensor measurement records to provide an efficient mechanism for querying the sensor records equated to a uniquely identified object.

4. The information provided by the linked sensor measurements can be used to add and update information in the Object status and geolocation database 27 for the equated object.

5. And the information provided by linked sensor measurements may be used to add and update information in the Object technical characteristics database 25 for the equated object if previously unknown technical characteristics are provided by the linked sensor measurements.

In the Linked measurement equation process 21, a uniquely identified object could use the final candidate objects for the linked sensor records as a starting point for generating its initial list of candidate objects. However, this shortcut may create problems. For example, the Object status and geolocation database 27 is subject to major changes when mistakes are found in the information for a specific object. Since the classes of objects that the candidate selection and object equation algorithms are designed to handle are difficult to identify, mistakes in object identification can occur. As an example, a given object may leave a covered dry dock where it was being repaired for several months. During the period the object was invisible to most of the world, a false object status and geolocation history could have been created for it using sensor measurements collected on other similar objects. That is, that ship or object may have incorrectly assessed as being operational in some sea, rather than being in dry dock. A classic example would be a submarine.

When major mistakes occur in the deterministic linkage of sensor measurements to unique objects, the deterministic linkages between the impacted objects and the corresponding measurement data must be dissolved and the measurement-to-object equation process should be used to create new deterministic linkages between the measurement data and the unique objects.

However, this type of error generally does not impact the deterministic linkages between sensor measurements created by the multiple source correlation, tracking, and fusion algorithms. That is because correlation, tracking, and fusion algorithms are generally not able to distinguish between objects that are difficult-to-identify since these objects have nearly identical technical characteristics. For example, brand new cars of the same make and model with identical color and accessories are examples of difficult-to-identify objects.

Before proceeding, it should be appreciated that the meaning of the word "identification" is much more restrictive in the context of this disclosure than in how the word identification is often used in the English language. Therefore, identification in the context of this disclosure is understood to mean the determination of a unique identification label for an object that can be used to link information about a specific object from the time it was created or made until the time the object is destroyed.

Selection of Initial Candidates—For the purpose of this disclosure, the initial candidate selection process (described in the Association of Sensor Input Application) can be understood as a set of well-defined rules that enable attributes of the set of sensor measurements to be converted into specific object identification features. The features are matched against an object technical database that permits identification of specific candidate objects that have subsystems with physical characteristics that are consistent with object identification features. Since the combined measurement attributes provided by a set of multiple source measurements (now "linked" to the object) provide much greater candidate object discrimination than a single sensor measurement, the initial set of candidates provided by the selection process is expected to be much smaller in the process that attempts to equate these measurements to a uniquely identified object than in the candidate selection process that is used for single sensor measurements. Related details are described in the Association of Sensor Input Application.

Calculation of Candidate Object Speed—The process of determining the speed required for a candidate object to travel from its best-known locations prior to and after object location specified by or determined from sensor measurements requires the maintenance of an object status and geolocation history database 27 on each object of interest. In addition, if the class of object is subject to land avoidance constraints, then knowledge of minimal-length paths between two points on the surface of the ocean that avoid the crossing of landmasses is required. The land avoidance information is class dependent since certain routes are not possible for all sizes and types of ships; e.g., super tankers are too large for the Suez Canal. Related details are described in the Association of Sensor Input Application.

Object Status and Geolocation History Database—The technical features of the object status and geolocation history database are described in the Association of Sensor Input Application.

Land-Avoidance Database—The technical features of the land-avoidance database are described in the Association of Sensor Input Application.

Speed Calculation—The technical features of the speed calculation are very similar to those described in the Association of Sensor Input Application. However, there are some very important differences. Instead of using a single location and inferred object status value corresponding to a single sensor measurement, the exemplary system now processes information corresponding to a linked set of multiple source sensor measurements during a time interval. Judgment must be used in developing the process used to equate linked sensor measurements to a uniquely identified object to eliminate nearly redundant calculations for successive sensor measurements in the linked set so that the algorithm runs with reasonable efficiency.

In detail, let $\tau_1$ be the time of the earliest sensor measurement and $\tau_2$ be the time of the last sensor measurement in the linked set of measurements. The method for eliminating redundant calculations simply selects measurements that provide a specified amount of diversity in the time and geographic information selected for processing. Let the index character k be used to represent a sampled measurement where the values for k vary between 1 and M where $T_{k=1}=\tau_1$ and $T_{k=M}=\tau_2$. The following process is then repeated M times as index k varies between 1 and M:

Let $T_1, P_1, L_1$, and $S_1$ represent the time, position, location uncertainty, and status of a given object in the object history database just prior to the time of a selected sensor measurement. Let $T_k, P_k, L_k$, and $S_k$ represent the time, position, location uncertainty, and inferred status corresponding to the $k^{th}$ measurement in the linked set of sensor measurements. Let $T_2, P_2, L_2$, and $S_2$ represent the time, position, location uncertainty, and inferred status for the candidate object just after the time of the sensor measurement.

The speed-of-advance from point $P_1$ to point $P_k$ is estimated as:

$$s_1 = \frac{d_1^{min}(P_1, P_k)}{\Delta t_1} \tag{1}$$

$$d^{min}_1 = [0, d_{1a}(P_1, P_k) - u_{L_1}(P_1) - u_{L_k}(P_k)] \tag{2}$$

$$\Delta t_1 = \max[1, T_k - T_1 - c(S_1, S_k)] \tag{3}$$

The function $c(S_1, S_k)$ provides an estimate of the minimum amount of time required to change the candidate object's status from $S_1$ to $S_k$.

Similarly, the speed-of-advance from point $P_k$ to point $P_2$ is estimated as:

$$s_2 = \frac{d_2^{min}(P_k, P_2)}{\Delta t_2} \text{ where} \quad (4)$$

$$d^{min}_2 = \max[0, d_{1a}(P_k, P_2) - u_{L_k}(P_k) - u_{L_2}(P_2)] \quad (5)$$

and $$\Delta t_2 = \max[1, T_2 - T_k - c(S_k, S_2)] \quad (6)$$

where

The function $c(S_a, S_b)$ is non-symmetrical. For example, the time required to change status from "in-port, heavy repair" to status "at-sea, operational" is not the same as the time required to change from "at-sea, operational" to "in-port, heavy repair". The first change normally requires a period of trials and training. The function $c(S_a, S_b)$ is also object-class dependent. Now the linked speed calculation parameters do not contain redundant link calculations.

Determination of Linkage Probabilities and Final Candidate—Once the M sets of speeds have been determined for the candidate objects, the problem of estimating the probability that the linked sensor measurement can be associated with a candidate object depends on the model used to represent the kinematical behavior of the class to which the object belongs.

The equations used to determine the weights and linkage probabilities can be heuristic. These equations depend on how the behavior of the candidate objects is modeled for a particular class of objects. The model that will be described below may work for some objects, but different models will be required for different classes of objects. These different heuristic models need to be tuned to the behavior of different classes of objects. The different heuristic models permit the invention to be applied to many different problems in which sensor measurement data needs to be associated with specific objects. The algorithm rules database provides information that permits the different models of object behavior to be tuned to a specific class of objects.

The following set of equations corresponds to a simple model that considers two speed values for an object class $S_{normal}$ and $S_{max}$ and the endurance time $T_e$ at which an object belonging to this class can operate at maximum speed. The following equations are then used to calculate a weight for each candidate object for a specific sensor measurement. Measurement association probabilities are calculated from the ratio of the weight determined for a particular candidate object to the combined weight of the entire set of initial candidate objects.

Let $s_j = \max[\max(s_1^1, s_2^1), \max(s_1^2, s_2^2), \max(s_1^3, s_2^3), \ldots, \max(s_1^M, s_2^M)]$ for the $j^{th}$ candidate object if two speed values are calculated for all M samples. Otherwise, let $s_j$ be maximum of all of the speed values calculated for a candidate object. If no speed value is calculated for the $j^{th}$ candidate object, let the weight $w_j = w_3$ be assigned it. (If no speed value is calculated for the $j^{th}$ candidate object, the comprehensive object status and geolocation history database contains no information for this object.)

Assign $\Delta t_j$ to set equal to either $\Delta t_1^k$ or $\Delta t_2^k$, depending on the speed value selected for $s_j$.

If $s_j \leq S_{normal}$, the weight assigned to the $j^{th}$ candidate object is $$w_j = w_1. \quad (7)$$

If $S_{normal} < s_j \leq S_{max}$, the weight assigned to the $j^{th}$ candidate object is $$w_j = w_1 \left[\frac{S_{max} - s_j}{S_{max} - S_{normal}}\right] + w_2 \left[\frac{s_j - S_{normal}}{S_{max} - S_{normal}}\right] \exp\left(-\frac{\Delta t_j}{T_e}\right). \quad (8)$$

If $s_j > S_{max}$, the weight assigned to the $j^{th}$ candidate object is $$w_j = w_2 \exp\left(-\frac{10 \times \Delta t_j}{T_e}\right). \quad (9)$$

The following relationship exists about the three weights:

$$w_1 > w_2 > w_3. \quad (10)$$

The weight for the $j^{th}$ candidate object that is determined by these equations transitions from the value $w_1$ when the speed of the object is less than or equal to $S_{normal}$ to a value less than $w_2$ when the object has a speed greater than $S_{max}$. The weight for the $j^{th}$ candidate object also decays exponentially as its speed approaches $S_{max}$ for a time period that approaches the object's endurance time at maximum speed. The weight $w_3$ assigned to a new object permits the new object to also be considered as a candidate for the set of linked sensor measurements with low probability. If the new candidate object is the only object that matches the object with significant weight, it can be equated to the sensor measurement.

If there are m initial candidate objects, let $$w_T = \sum_{j=1}^{m} w_j. \quad (11)$$

The data association probability for the $j^{th}$ candidate object is then estimated by $$p_j = \frac{w_j}{w_T}. \quad (12)$$

The final set of candidate objects is selected by finding those candidates for which $P_j$ exceeds a preset threshold value.

If more than one candidate object has data association probabilities that are above the threshold value, the linked sensor measurement process stores the object identification labels and the corresponding measurement association probabilities in a "Master Track-to-Object Linkage" table in the Linked sensor measurement database 23. The "Master Track-to-Object Linkage" table may contain four data fields: date-time-group for the time of the linked measurement set equation process decision, unique master track identification label, unique object identification label, and data association probability. The number of records stored in the "Master Track-to-Object Linkage" table is equal to the number of final candidate objects generated by the Linked measurement equation process 21.

If only one candidate object has data association probabilities that are greater than or equal to the threshold value, the linked multiple source measurements are equated to the uniquely identified object:

1. The unique object identification label can be stored as an "indexed" data field in linked sensor measurement records to provide an efficient mechanism for querying the sensor records equated to a uniquely identified object.

2. The information provided by the linked sensor measurements can be used to add and update information in the Object status and geolocation database 27 for the equated object.

3. The information provided by linked sensor measurements may be used in a learning process to add and update information in the Object technical characteristics database 25 for the equated object if previously unknown technical characteristics are provided by the linked sensor measurements.

Since information in the Object technical characteristics database 25 should be carefully controlled to ensure the quality and consistency of the information, an operator alert may be generated when the linked sensor measurements provide new information about the equated object. An analyst could then decide whether the new technical information has sufficient consistency and reliability to update the Object technical characteristic database 25 for the object.

Figure 3:
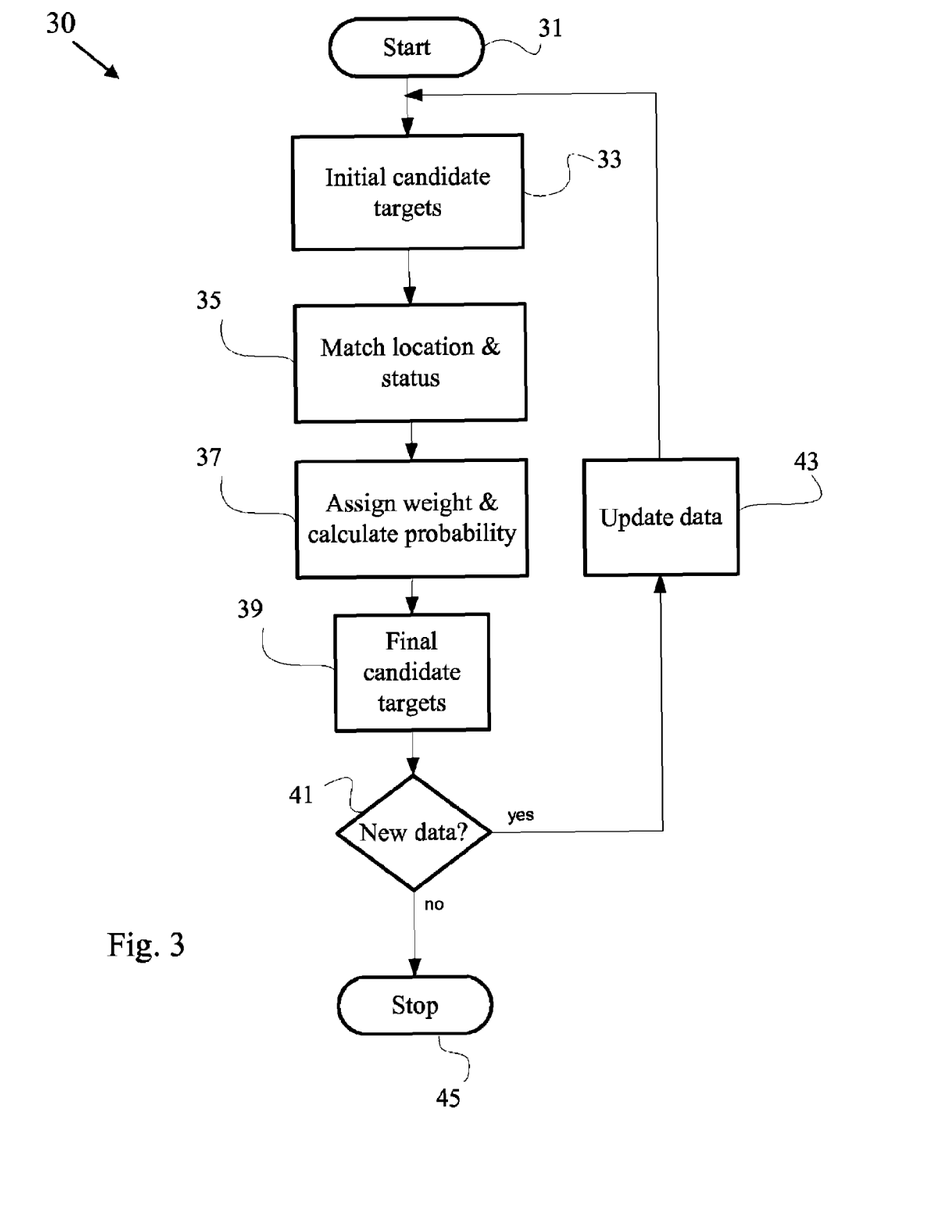
FIG. 3 is a flow chart illustrating an exemplary process of this disclosure.

FIG. 3 is a flow chart illustrating an exemplary process 30 of an embodiment of this disclosure. The exemplary process 30 begins with initialization at step 31 and proceeds to the initial candidate selection module 33, where initial candidate selection is performed based on any of the methods and systems described above. After completion of the initial candidate selection in the initial candidate selection module 33, the exemplary process 30 proceeds to the matching 35 of the location and status information of the initial candidates objects to update information on the initial candidate objects. Next, weights are assigned 37 to each initial candidate object (using information from the calculated speed, etc.) and an association probability 37 is generated for mapping the initial candidate objects to final candidate objects. The final candidate objects mapping 39 may be a separate process or may be part of the assign & calculate module 37. Next, the new data module 41 assesses the introduction of information or data that may not have been available to above modules during the final candidate selection process. If new data is determined to have arrived or become "relevant" then the exemplary process 30 branches to the "update data" module 43 wherein the new data's information is incorporated into various systems or processes that are used by exemplary process 30, for re-evaluation of the initial/final candidate selection. Depending on the impact of the "new" data, the re-evaluated initial candidate(s) may result in different initial candidates.

Alternatively, if the new data evaluation module 41 determines that there is no new data or no new "relevant" data, then the exemplary process 30 proceeds to termination 45. In some embodiments, the final candidate objects module 39 may be situated after the new data evaluation module 41. It should be appreciated that depending on the threshold set at the new data module 41, the exemplary process 30 may proceed without re-evaluating the respective modules 33, 35, 37, 39, even though new data is determined to be present, to avoid loss of efficiency. Consequently, by adjusting the threshold values for determining whether new data should be acted upon, the exemplary process 30 may be spared having to perform a re-evaluation for every new instance of data.

The following section provides a simple concrete example to illustrate the exemplary concepts described above. The example uses arbitrary information and does not correspond to any real application, but it illustrates how equations 7 through 12 can be used to calculate data associated probabilities. Table 1 provides arbitrary values for the constant parameters described in equations 7 through 12, and Table 2 applies these arbitrary parameters to two sets of random speed and time values determined for 10 candidate objects. The two sets of random speeds correspond to the fact that a linked set of multiple source sensor measurements provides a greater diversity in time and geographic information than a single sensor measurement; i.e., the value of the parameter M is assumed to be two. The fact that 10 candidate objects were initially selected as candidate objects reflects the greater object discrimination provided by the combined parametric information supplied by a set of linked multiple source sensor measurements when compared to the information provided by a single sensor measurement. With the exception of endurance time, the values of parameters in Table 1 are identical to the values selected for these parameters in the example used for the process that associates a single sensor measurement with candidate objects.

The speed values were generated by multiplying the Excel random number generator function rand( ) by 50. The time values were generated by 20*rand( ). The actual weights and speed values used by the embodiments disclosed herein will depend on the specific candidate object selection process used. The Linked measurement equation process 21 can be applied to resolve data fusion issues for many different types of objects.

TABLE 1

Arbitrary Speed, Endurance Time, and Speed Values

| Name | Value | Units | Description |
|------|-------|-------|-------------|
| ns | 10.0 | knots | normal speed |
| ms | 20.0 | knots | maximum speed |
| te | 2.0 | hour | endurance time |
| wt1 | 10.0 | n/a | weight-1 |
| wt2 | 5.0 | n/a | weight-2 |
| wt3 | 3.0 | n/a | weight-3 |

TABLE 2

Measurement Association Probabilities for Ten Candidate Objects

| Initial Candidates | Candidate Speed-1 | Candidate Time-1 | Candidate Speed-2 | Candidate Time-2 | Weight | Assoc. Prob. | Final Candidate |
|---|---|---|---|---|---|---|---|
| 1 | 26.7 | 19.0 | 26.7 | 2.5 | 0.000 | 0.0 | |
| 2 | 34.5 | 49.3 | 49.3 | 9.3 | 0.000 | 0.0 | |
| 3 | 45.4 | 36.9 | 45.4 | 13.4 | 0.000 | 0.0 | |
| 4 | 38.0 | 6.2 | 38.0 | 2.4 | 0.000 | 0.0 | |
| 5 | 12.3 | 8.7 | 12.3 | 10.8 | 7.659 | 100.0 | 5 |
| 6 | 8.2 | 20.8 | 20.8 | 6.9 | 0.000 | 0.0 | |
| 7 | 15.7 | 48.5 | 48.5 | 6.5 | 0.000 | 0.0 | |
| 8 | 47.9 | 3.0 | 47.9 | 11.6 | 0.000 | 0.0 | |
| 9 | 13.9 | 24.7 | 24.7 | 15.1 | 0.000 | 0.0 | |
| 10 | 24.3 | 14.9 | 24.3 | 8.8 | 0.000 | 0.0 | |
| | | | | Total | 7.659 | 100.0 | |

There are both important conceptual and computational advantages to the exemplary embodiments described herein. For example, different identification features that are available from a wide variety of sensors, object-specific and object-class-specific properties, and object-specific location and status histories are systematically fused to associate sensor measurements with a finite set of objects. Further, multiple identification features available from linked multiple source sensor measurements are all used to select candidate objects. Additionally, the best-known information pertaining to the location and status of each candidate object is used effectively in the linked sensor measurement equation process including various measures of uncertainty in the location of the object.

Moreover, the probabilistic association of linked multiple source sensor measurements to consistent candidate objects permits a precise representation of the information content of each sensor measurement in the context of a multiple source information environment for a finite set of objects. Further, association of linked multiple source sensor measurements to a uniquely identified object permits a detailed analysis of the object's historical behavior, the estimation of the object's status during the time span of the linked measurements, and prediction of the object's future behavior. Also, significant indicators can be observed from the trend analysis for a set of related objects when detailed historical, current, and future information is available for each object in the set.

The exemplary embodiments described herein, when applied to the ocean surveillance contact association problem, should permit the effective association of millions of linked multiple source sensor measurements to hundreds of hundreds of thousand uniquely identified objects using readily available computing and data management resources.

It will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A method to arrive at a set of uniquely identified candidate objects comprising:
   (a) obtaining input data from physical phenomena sensors;
   (b) comparing the input data to known technical attributes of uniquely identified objects to obtain a set of initial candidate objects;
   (c) obtaining best-known object location and status history for each initial candidate object using previously known location and status information of each initial candidate object;
   (d) assigning a statistical weight to each initial candidate object based on its maximum calculated speed and speed capabilities of each initial candidate object;
   (e) generating an association probability of each of the initial candidate objects to the input data to arrive at a set of final candidate objects; and
   (f) re-evaluating any of the above steps (a)-(e) with data considered to be current that was not used in the above steps (a)-(e), wherein the set of final candidate objects are uniquely identified candidate objects arrived at with current data.

2. The method according to claim 1, wherein step (e) further comprises:
   using an algorithm rules database to control the final candidate object selection calculations.

3. The method according to claim 1, wherein the data considered to be current is evaluated on a threshold of data criteria.

4. The method according to claim 1, wherein the data considered to be current is evaluated on a time period.

5. The method according to claim 1, wherein the data considered to be current is incorporated into a database supplying the input data.

6. The method according to claim 1, wherein a database supplying the input data is updated with the data considered to be current.

7. The method according to claim 1, wherein redundant calculations arising from the data considered to be current are avoided by utilizing measurements that provide a predetermined amount of diversity in the time and geographic information.

8. The method according to claim 7, wherein the diversity can be any one or more of T, P, L, and S, where $T_1, P_1, L_1$, and $S_1$ represent time, position, location uncertainty, and status of a given object in an object history database just prior to the time of a selected sensor measurement; $T_k, P_k, L_k$, and $S_k$ represent time, position, location uncertainty, and inferred status corresponding to a $k^{th}$ measurement in a linked set of sensor measurements; and $T_2, P_2, L_2$, and $S_2$ represent time, position, location uncertainty, and inferred status for the initial candidate object just after the time of the sensor measurement selected for processing, where the character k is used to represent a sampled measurement where the values for k vary between 1 and M where $T_{k=1}=\tau_1$ and $T_{k=M}=\tau_2$, wherein a speed-of-advance $s_1$ from point $P_1$ to point $P_k$ is estimated as $$s_1 = \frac{d_1^{min}(P_1, P_k)}{\Delta t_1},$$

where minimum obstacle-avoidance distance $d_1^{min}$ from the point $P_1$ to the point $P_k$ may be calculated according to $$d^{min}{}_1 = \max[0, d_{1a}(P_1, P_k) - u_{L_1}(P_1) - u_{L_k}(P_k)],$$

where time difference $\Delta t_1$ maybe calculated according to $$\Delta t_1 = \max[1, T_k - T_1 - c(S_1, S_k)],$$

where T represents time provided by the input data, $T_1$ is time of the most recent historical position for a $j^{th}$ initial candidate before the time of the input data, then time difference transition function $c(S_1, S_k)$ provides an estimate of a minimum amount of time required to change the initial candidate object's status from $S_1$ to $S_k$.

9. The method according to claim 8, wherein calculation of the speed-of-advance, minimum obstacle-avoidance distance, time difference, and time difference transition function is repeated M times as the index k varies between 1 and M, to provide the estimate of a minimum amount of time required to change the initial candidate object's status from $S_1$ to $S_k$.

10. The method according to claim 1, where data considered to be current is directly related to new sensor measurement data.

11. A system to associate input data with status, location, and technical attributes to arrive at a uniquely identified candidate object, comprising:
   a computer;
   means for obtaining a set of initial candidate objects based on input data being compared to known attributes of uniquely identified objects;
   means for obtaining best known object location and status history for each initial candidate object using previously known location and status information of each initial candidate object;
   means for assigning a statistical weight to each initial candidate object based on its maximum calculated speed and speed capabilities of each initial candidate object;
   means for generating an association probability of each of the initial candidate objects to the input data to arrive at a set of final candidate objects; and
   means for re-evaluating any of the above means with data considered to be current that was not used, wherein the set of final candidate objects are uniquely identified candidate objects arrived at with current data.

12. The system according to claim 11, wherein the data considered to be current is evaluated on a threshold of data criteria.

13. The system according to claim 11, wherein the data considered to be current is evaluated on a time period.

14. The system according to claim 11, wherein the data considered to be current is incorporated into a database supplying the input data.

15. The system according to claim 11, wherein a database supplying the input data is updated with the data considered to be current.

16. The system according to claim 11, wherein redundant calculations arising from the data considered to be current are avoided by utilizing measurements that provide a pre-determined amount of diversity in the time and geographic information.

17. The system according to claim 11, wherein the diversity can be any one or more of T, P. L, and S, where $T_1, P_1, L_1$, and $S_1$ represent time, position, location uncertainty, and status of a given object in an object history database just prior to the time of a selected sensor measurement; $T_k, P_k, L_k$, and $S_k$ represent time, position, location uncertainty, and inferred status corresponding to a $k^{th}$ measurement in a linked set of sensor measurements; and $T_2, P_2, L_2$, and $S_2$ represent time, position, location uncertainty, and inferred status for the initial candidate object just after the time of the sensor measurement selected for processing, where the character k is used to represent a sampled measurement where the values for k vary between 1 and M where $T_{k=1} = \tau_1$ and $T_{k=M} = \tau_2$, wherein a speed-of-advance $s_1$ from point $P_1$ to point $P_k$ is estimated as $$s_1 = \frac{d_1^{min}(P_1, P_k)}{\Delta t_1},$$

where minimum obstacle-avoidance distance $d_1^{min}$ from the point $P_1$ to the point $P_k$ may be calculated according to $$d^{min}_1 = \max[0, d_{1a}(P_1, P_k) - u_{L_1}(P_1) - u_{L_k}(P_k)],$$

where time difference $\Delta t_1$ maybe calculated according to $$\Delta t_1 = \max[1, T_k - T_1 - c(S_1, S_k)],$$

where T represents time provided by the input data, $T_1$ is time of the most recent historical position for a $j^{th}$ initial candidate before the time of the input data, then time difference transition function $c(S_1, S_k)$ provides an estimate of a minimum amount of time required to change the initial candidate object's status from $S_1$ to $S_k$.

18. The system according to claim 17, wherein the index character k varies between 1 and M where $T_{k=1} = \tau_1$ and $T_{k=M} = \tau_2$, wherein calculation of the speed-of-advance, minimum obstacle-avoidance distance, time difference, and time difference transition function is repeated M times as index k varies between 1 and M, to provide the estimate of a minimum amount of time required to change the initial candidate object's status from $S_1$ to $S_k$.

19. The system according to claim 11, where data considered to be current is directly related to new sensor measurement data.

* * * * *